F. S. CHASE.
AUTOMATIC SCREW SLOTTING MACHINE.
APPLICATION FILED APR. 7, 1915.

1,252,884.

Patented Jan. 8, 1918.
8 SHEETS—SHEET 4.

Witnesses

Inventor
Frank S. Chase
By Sturtevant & Mason
Attorneys

F. S. CHASE.
AUTOMATIC SCREW SLOTTING MACHINE.
APPLICATION FILED APR. 7, 1915.

1,252,884.

Patented Jan. 8, 1918.
8 SHEETS—SHEET 8.

UNITED STATES PATENT OFFICE.

FRANK S. CHASE, OF TORRINGTON, CONNECTICUT, ASSIGNOR TO THE PROGRESSIVE MANUFACTURING COMPANY, OF TORRINGTON, CONNECTICUT, A CORPORATION OF CONNECTICUT.

AUTOMATIC SCREW-SLOTTING MACHINE.

1,252,884.

Specification of Letters Patent.  Patented Jan. 8, 1918.

Application filed April 7, 1915.  Serial No. 19,683.

*To all whom it may concern:*

Be it known that I, FRANK S. CHASE, a citizen of the United States, residing at Torrington, in the county of Litchfield, State of Connecticut, have invented certain new and useful Improvements in Automatic Screw-Slotting Machines, of which the following is a description, reference being had to the accompanying drawing and to the letters and figures of reference marked thereon.

This invention relates to a machine for automatically slotting screws, and the object is to provide a simple, efficient, durable and comparatively inexpensive machine, which may be economically operated to produce larger quantities and a higher grade of work than have been heretofore produced by machines employed for slotting screws.

To this end the invention consists of an organized screw-slotting machine, in which a plurality of intermittently rotated turrets for holding the blanks are provided, with coöperating feeding devices, gripping devices, saws and ejecting devices, capable respectively of joint operation or of independent operation, that is, one half of the coöperating devices may be used for slotting the screws, and the other set be idle, or both sets may operate together.

A screw-slotting machine construction in accordance with this invention has been especially designed with a view to providing an automatic mechanism in which the screws are selected and delivered one at a time, to each of two rotating heads or turrets, each having a series of pockets or recesses for receiving screws, and carrying them successively into position to be engaged by the saw or cutter. When a screw has been brought into position to be slotted, it is clamped and held rigidly in place by a gripping mechanism operated from the main shaft of the machine, the pivoted saw frame is also swung down to operative position, and the saw performs its work on the stationarily-held screw.

While the screw-slotting machine constructed in accordance with this invention has been especially designed with a view of slotting very small machine screws, it is to be understood that I do not wish to be limited to such use.

My invention is illustrated in the accompanying drawings, in which,—

Fig. 3ª is a detail of the slotting saw mechanism;

Fig. 3ᵇ is a detail of the turret cam;

Fig. 4 is an enlarged vertical sectional view through one of the rotating turret heads, with the feeding chute leading thereto in elevation;

Fig. 5 is a detail plan of the feeding chute, showing how it may be adjusted for screws of different diameters;

Fig. 5ª is a detail section on line 5ª—5ª of Fig. 5;

Figure 1:
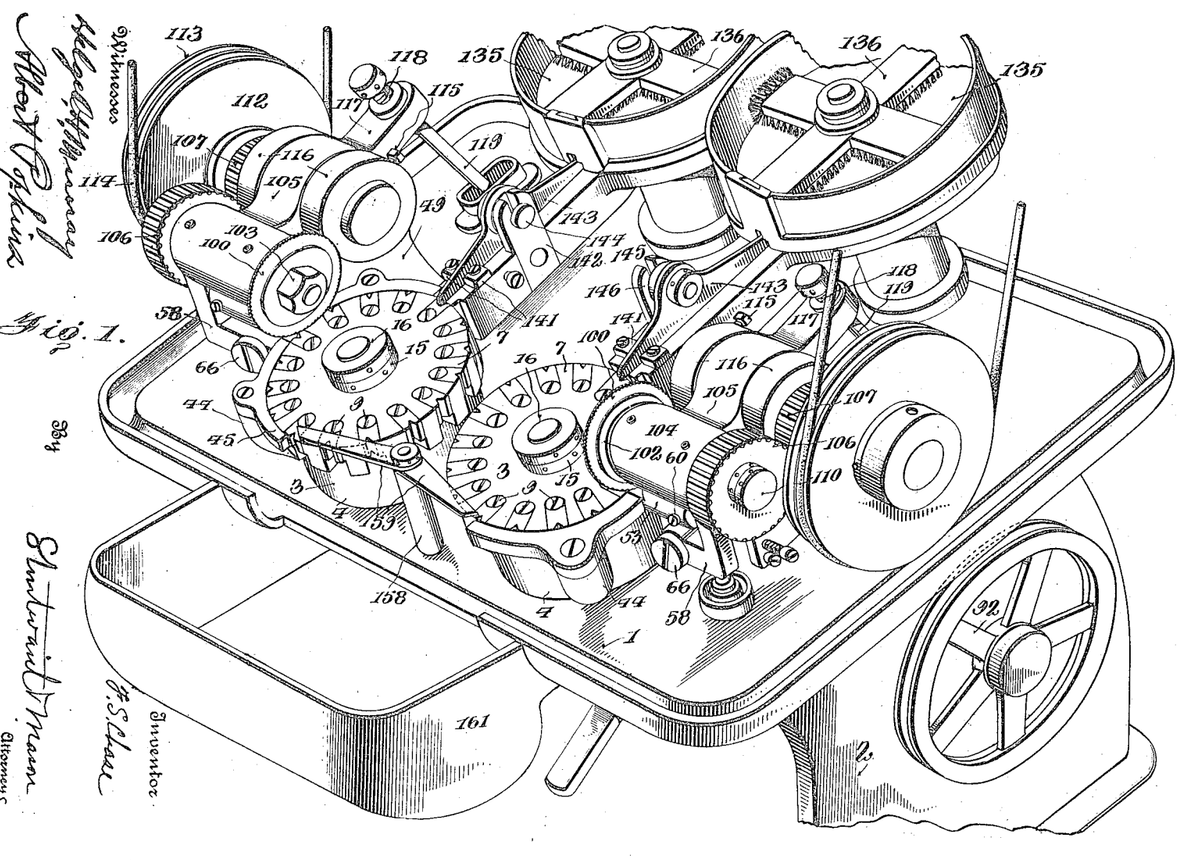
Figure 1 is a perspective view of my improved automatic screw-slotting machine.

The successive operations that take place will be described in detail, but a brief outline is as follows:

The screws are first fed from a suitable hopper into a plurality of revolving screw-receiving heads or turrets, in which latter they are transmitted a quarter of a turn in the direction of the arrow (see Fig. 1) to the gripping and slotting mechanisms.

The gripping mechanisms operate substantially simultaneously with the slotting mechanisms, but they will be described in the order above named. After being slotted, the screws are transmitted a greater distance in the turrets from which they are finally ejected.

As the mechanisms are in duplicate, the machine being a twin machine, the description of one will suffice for both, and similar numerals refer to similar parts on the drawings.

Referring to the drawings, the numeral 1 indicates a bed plate, upon which is mounted for rotation, the revolving screw-receiving heads or turrets.

This bed plate 1, as herein shown, is supported upon suitable legs or standards 2, but it may be supported so as to permit of its being secured to a bench or other foundation of that character, as found most convenient. The plate, however, is disposed at an angle to its support, the purpose being that the screw blanks by the action of gravity be more readily fed into the receiving turrets, than if not so disposed. The angle is sufficient for perfect gravitation of the screw through the feed chute into the turret head hereinafter described.

*Turret mechanism.*

Figures 4, 5, 5A:
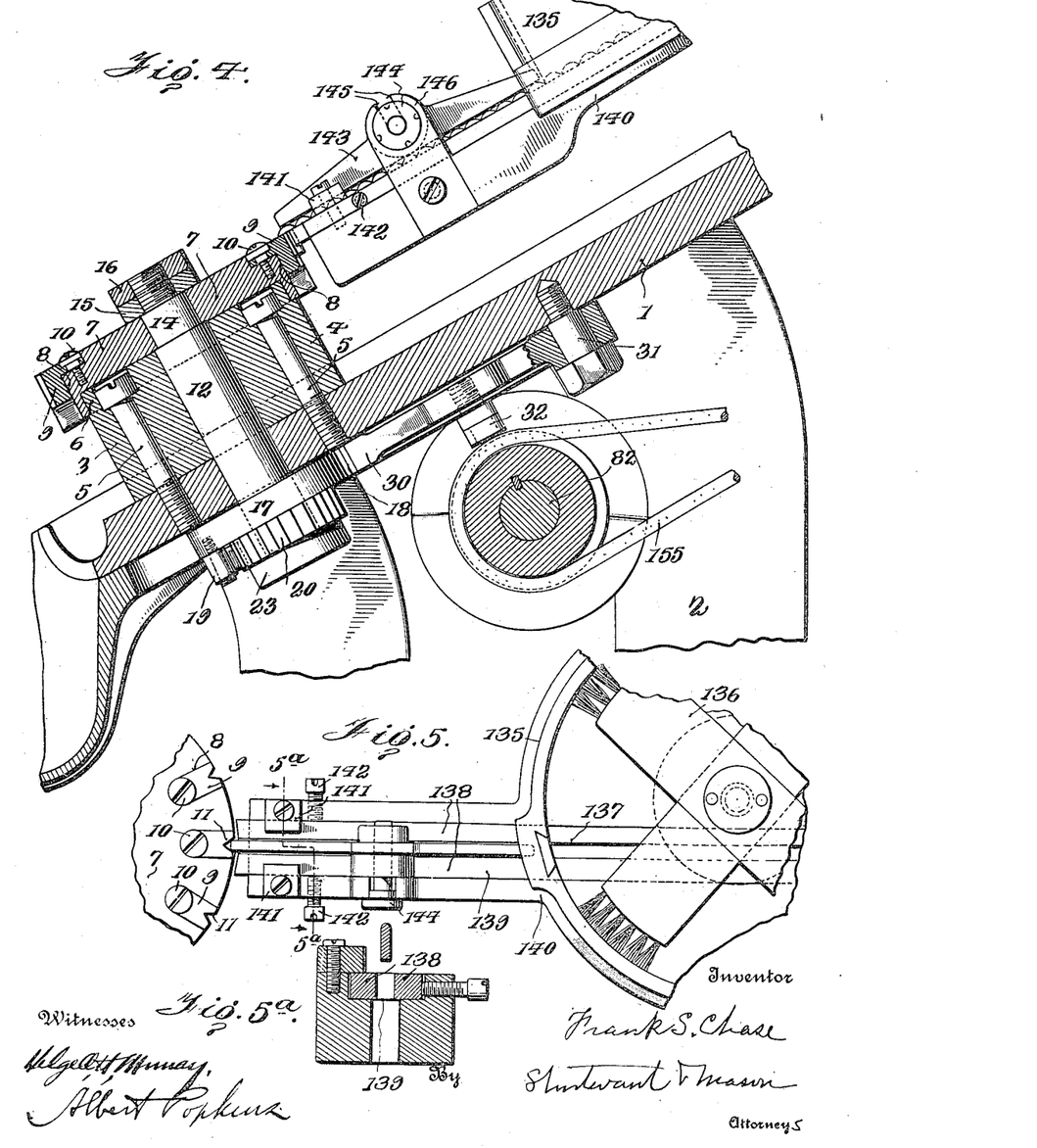

Referring to Fig. 4, each turret head 3 comprises a body portion or foundation 4, secured to the bed plate 1 by the countersunk screws 5.

Revolving upon the reduced part 6 of this foundation 4 is a disk 7, provided at regular intervals around its periphery with recesses 8, adapted to receive the screw-holding chucks 9.

Figure 11:
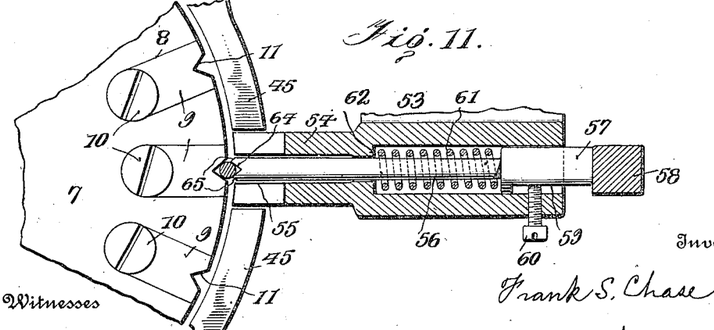
Fig. 11 is an enlarged sectional view of the plunger or rod that grips the screw and holds it in the recess in the turret while it is being slotted.

The screw-holding chucks are firmly held in their respective recesses in the disk 7 by screws 10, and are provided with pockets or V-shaped notches 11 extending the depth of the chuck, which are adapted to receive approximately one-half of the screw, as shown in Fig. 11, while undergoing the several operations.

A shaft 12 extends through the foundation 4 and has keyed to its reduced upper end 14, the said disk 7.

A nut 15 and lock nut 16 are provided upon the further reduced end of the shaft 12, to hold in place the disk 7. Loosely mounted for rotation upon the shaft 12 is the disk 17, having a portion of its periphery provided with teeth 18, which mesh with corresponding teeth upon a pivoted segment 30, hereinafter described and shown in Fig. 6.

Figure 6:
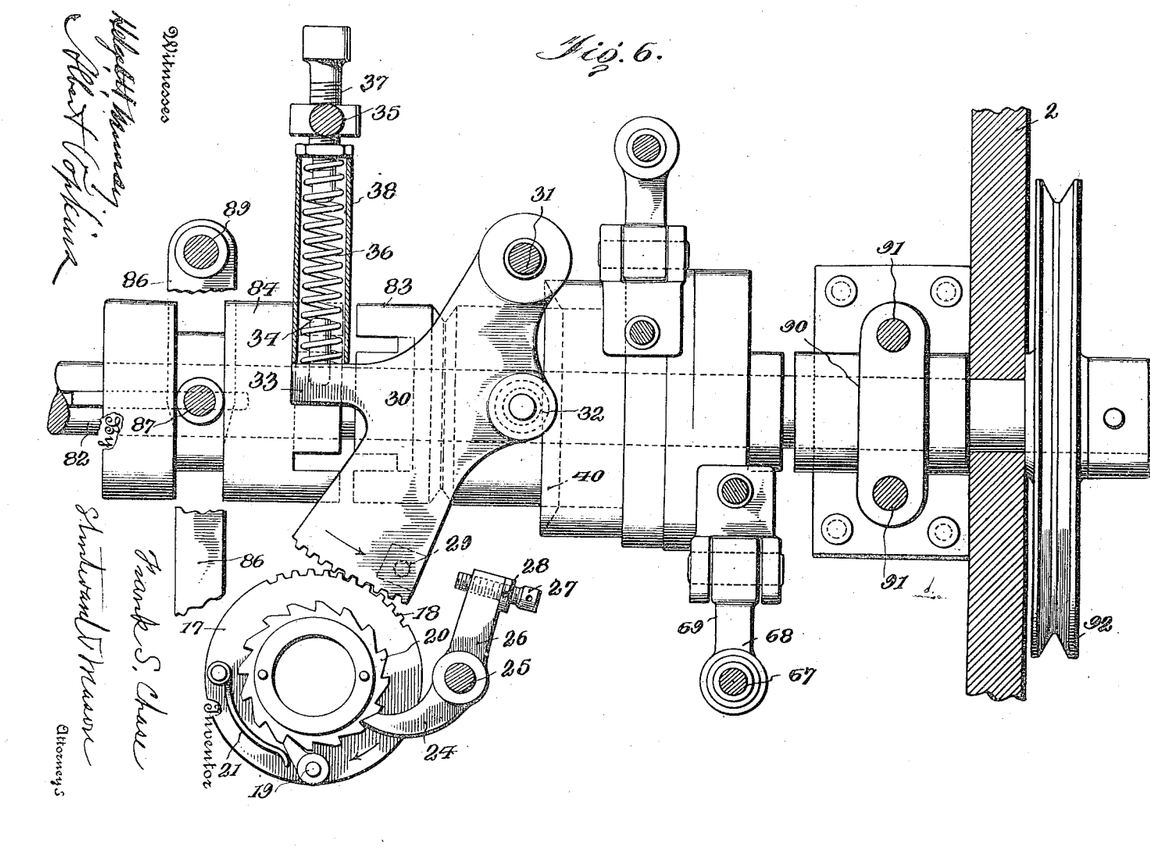
Fig. 6 is an enlarged plan view of the turret-rotating mechanism and the cams for operating the gripping and slotting mechanisms.

The toothed disk 17 has fastened to its under face an operating pawl 19, adapted to engage and rotate a ratchet wheel 20, keyed to the shaft 12. Referring to Fig. 6, it will be seen that this operating pawl 19 is held in engagement with the ratchet 20 by the spring 21 secured to the disk 17.

The shaft 12 has an enlarged head, as at 23, which prevents the dropping or otherwise displacement of the parts carried thereby.

Coöperating with the operating pawl 19 is a locking pawl 24, pivoted on the under side of the bed plate 1, as at 25, which carries an extension 26 in which latter is secured an adjusting screw 27. This adjusting screw 27 is provided with a lock nut 28, so that it may be held securely after being once set for operation.

The purpose of this locking pawl 24 is to prevent back motion of the ratchet wheel 20 after being moved by the operating pawl 19.

This pawl 24 is, upon the rotation of the ratchet wheel 20, thrown out of engagement therewith, but upon the completion of the travel of the segment 30, which meshes with the toothed disk 17, hereinbefore referred to, as indicated by the arrow in Fig. 6, the locking pawl 24 will be immediately forced into engagement with the ratchet wheel 20, by reason of the lug 29 carried by the segment 30, contacting with the screw, held in the extension 26 of the locking pawl 24. This pawl 24 when so forced into engagement, will firmly lock the ratchet wheel 20 against any possible rotation, and in so doing prevent any dislodgment of the screws that are being gripped and slotted.

The segment 30 hereinbefore referred to, is pivotally mounted on the under side of the bed plate 1 at 31, see Figs. 4 and 6, and is provided with the roller 32, rotatably secured to said segment. This roller contacts with the face of a cam 40.

The segment 30 is formed with an extension 33, provided with a pin 34. Interposed between this said pin 34 and an abutment 35 secured to the bed plate is a spring 36, the purpose of which is to always insure a positive action, whereby the roller 32 carried by the segment 30 is forced against the face of the cam 40, and rendered operative thereon.

A spring tensioning device 37 passes through the abutment and regulates the pressure of the roller upon the cam surface. A sleeve 38 encircles the spring 36, and keeps the same in alinement with the projecting pins of the segment and the abutment depending from the bed plate.

The cam upon which the roller 32 operates, as heretofore mentioned, is indicated at 40. This cam is provided with the surface 41, which carries the roller 32 to hold the segment 30 in the position shown in Fig. 6 while riding thereon. When the roller enters the depression 42 of the said cam, the segment is moved upon its pivot, thus rotating the toothed disk 17, and through the pawl 19 the ratchet 20 and shaft 12, with the turret carried thereby. When the segment has completed its movement of driving the turret, it forces the locking pawl 24 into position, the spring retracts the segment, thus allowing the loose disk 17 to turn and withdraw pawl 19.

Secured to the main body portion or foundation of the turret 3 upon the outstanding lugs 44, is a screw-retaining guard 45, arranged half way around the turret. This guard is composed of two sections respectively, which abut against the sides of the cylindrical casing containing the screw-gripping rod or plunger, as best shown in Fig. 11.

A flat plate forming a top retaining guard 46 may be fitted over the heads of the screw while in transit, said plate being suitably secured to the guard-retaining sections.

The V-chucks or screw-receiving pockets 9, which are fitted within the cut out places 8 in the revolving turret, are held there by screws 10, which are countersunk into the chuck, as shown in Fig. 4. These chucks or screw-receiving pockets can be readily removed and different size pockets or V's, be substituted, depending, of course, upon the diameter of the screws being slotted.

Gripping mechanism.

Figure 10:
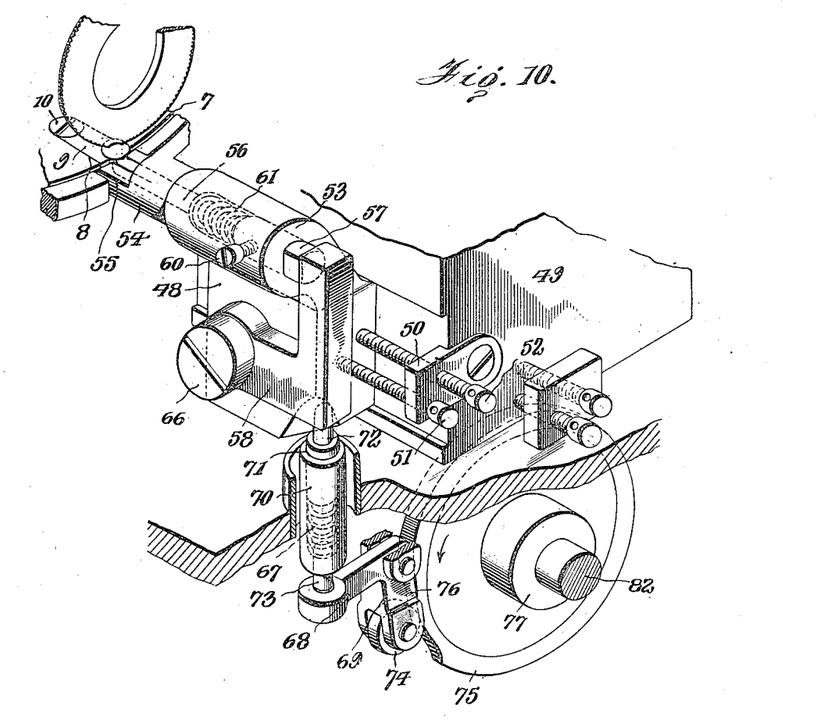
Fig. 10 is a detail perspective view of the gripping mechanism showing the manner in which the screw is gripped and held firmly while the slotting is taking place.

Taking up now this mechanism, and referring particularly to Figs. 10 and 11, the numeral 48 designates a block slidably mounted within an adjustable bearing block 49, adjustably secured to the bed plate by screws 132, 133 and elongated slots 134. To this said bearing block 49 is secured a plate 50, through which pass the adjusting screws 51 and 52, one of which is made fast to the block 48, and the other one simply bearing against the block. By this arrangement, an adjustment is provided for the bearing block 48, to vary the position of the gripper, and by the adjustment of the bearing block 49, the position of the slotting saw may be varied.

Each sliding block 48 is provided with a cylindrical outstanding sleeved extension 53, said extension being reduced as at 54, and still further reduced to a flat surface 55, where the screw is gripped, see Fig. 10.

Mounted within this cylindrical casing or sleeve extension 53, is a gripping rod or plunger 56, having at one end an enlarged head 57 adapted to project beyond the casing 53, and be engaged by one arm of an angular lever 58, hereafter described. This enlarged head of the plunger or rod is provided with a flattened surface 59, against which bears the set screw 60. The screw is so positioned as to afford a perfect reciprocation of the rod or plunger, and at the same time prevent it from becoming turned, so that it would not properly hold the screw to be slotted by the saw, shown in Fig. 10.

A spring 61 is interposed between the enlarged head 57 of this rod or plunger, and a shoulder 62 formed within the casing 53, and serves to restore the said gripping rod or plunger, thus releasing the screw and setting the plunger or rod for another operation. This rod or plunger 56 is formed with a notch 64, for gripping the screws as they are being slotted, as shown in Fig. 11, and it is also provided with beveled faces 65, adapted to fit the angle of the notch or V-pocket carried in the turret, should for any reason or cause whatever, a screw miss being properly positioned in its respective pocket.

The lever 58 hereinbefore referred to, is pivoted upon the sliding block 48 at 66, and normally rests upon the vertical spring plunger connection 67, see Fig. 10. This spring plunger connection 67 is interposed between the lever 58 and one arm 68 of a bell crank lever 69, mounted on the under side of the bed plate 1.

The connection consists of an outer sleeve 70, into which is slidingly fitted a plunger 71. This plunger 71 carries a pin 72, which fits within a depression in the under side of the lever 58. A spring is placed within the sleeve 70, and yieldingly forces the respective pins into their respective seats or depressions. A pin 73 is fitted into the lowermost end of the outer sleeve, and engages a depression in the arm of the bell crank lever 69. The bell crank lever 69 is pivoted between ears depending from the under side of the bed plate, and carries upon its depending arm a roller 74 adapted to engage a cam 75 secured upon a hub section carried by the main shaft, see Fig. 10.

The roller 74 is pivoted in the ears of the arm 76 of the bell crank lever, and is held in engagement with the cam surface by the action of the spring contained within the yielding connection hereinbefore described. This gripping cam 75 so referred to because of its action, and as differentiated from another cam to be described later, is secured to the hub section 77, that is, mounted upon the main shaft, by means of screws, as shown in Figs. 7, 8 and 9.

Figures 7, 8, 9:
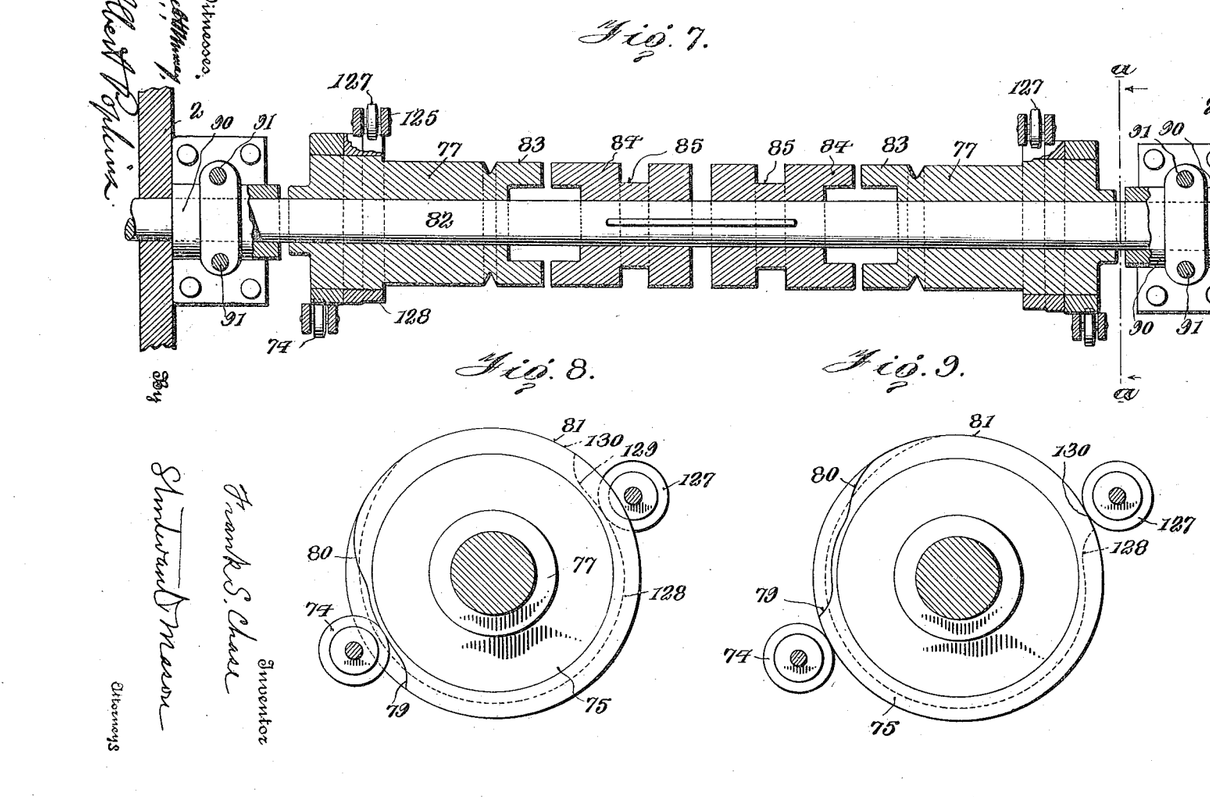
Fig. 7 is a horizontal sectional view through the main driving shaft, showing both clutch mechanisms out of engagement.
Figs. 8 and 9 are details of the cams for operating the gripping and slotting mechanisms, in different positions.

The gripping cam 75, the contour of which is shown in full lines in Figs. 8 and 9 and also Fig. 10, and in which first view (Fig. 8) the gripping roller 74 is shown as releasing the screw-gripping rod or plunger; is provided with a sudden depression 79, into which the roller 74 is forced when the screw is to be released, after it has been slotted. This roller 74 is allowed to pass along a reduced part of the cam during the period that the turret or head moves one step; when, upon completion of such step, it rides upon the surface 80, thus gradually allowing the screw to be gripped by the rod or plunger. As shown in Fig. 9 the roller is out of its depression on its respective cam, and is riding with gripping surface 81 of the cam.

The power mechanism will now be described, i. e., the manner in which the several mechanisms are caused to operate under certain conditions. The main shaft 82 is journaled in bearings 90 secured to the under side of the bed plate 1 by means of bolts 91. One end of the main shaft projects through the end leg support 2 of the frame, and at one end has fixed to it a grooved pulley 92, that may be connected to any suitable lubricating device, not shown.

To the other end of the main shaft is keyed a gear 93, which meshes with a small gear or pinion 94, keyed to a stud shaft 95. On this same stud shaft 95 is fixed a larger gear 96, adapted to mesh with a small gear 97, loosely mounted on the main shaft. This small gear is fastened tight to the stepped grooved pulleys 98, both of which rotate freely upon the main shaft.

This train of gearing permits of a more powerful operation of the machine, and is particularly adapted to cases where small round belting is found to be the most satisfactory for driving purposes. Small round belting is used throughout the machine, and serves a two-fold purpose, viz., a less floor space is required than in the case of the large flat belts, and the round belt can be repaired in much less time than the flat belt. The grooved pulleys used are particularly cut for receiving the round belting, and are capable of delivering the same degree of power that much larger flat pulleys would produce.

*The slotting mechanism.*

Taking up now the description of the slotting mechanism, the numeral 100 designates a slotting saw mounted upon one end of a shaft 101. The saw 100 is held between the collars 102 and a nut threaded upon the shaft as at 103.

The shaft 101 is journaled in a sleeve 104, upon the forward end of the pivoted saw frame 105, and is provided with a cone bearing, so that the wear may be taken up.

Upon the opposite end of the shaft is keyed a pinion 106, which meshes with a similar pinion 107, mounted upon the stud shaft 108. The pinion 106 is held in place by the nuts 109. The pinion 107 is keyed to a sleeve or bushing 111, which is free to rotate upon the stud shaft 108. To the other end of this sleeve or bushing 111 is secured the grooved pulley 112, around which passes the driving belt, from which the power to operate the slotting saw is derived.

A second grooved pulley 113 is loosely mounted upon the stud shaft and adjacent the grooved pulley 112. This second grooved pulley 113 is adapted to receive the driving belt 114, when the slotting saw is to be stopped, thus permitting of convenient shifting of the belt by hand, and without the aid of other mechanisms.

Figure 3:
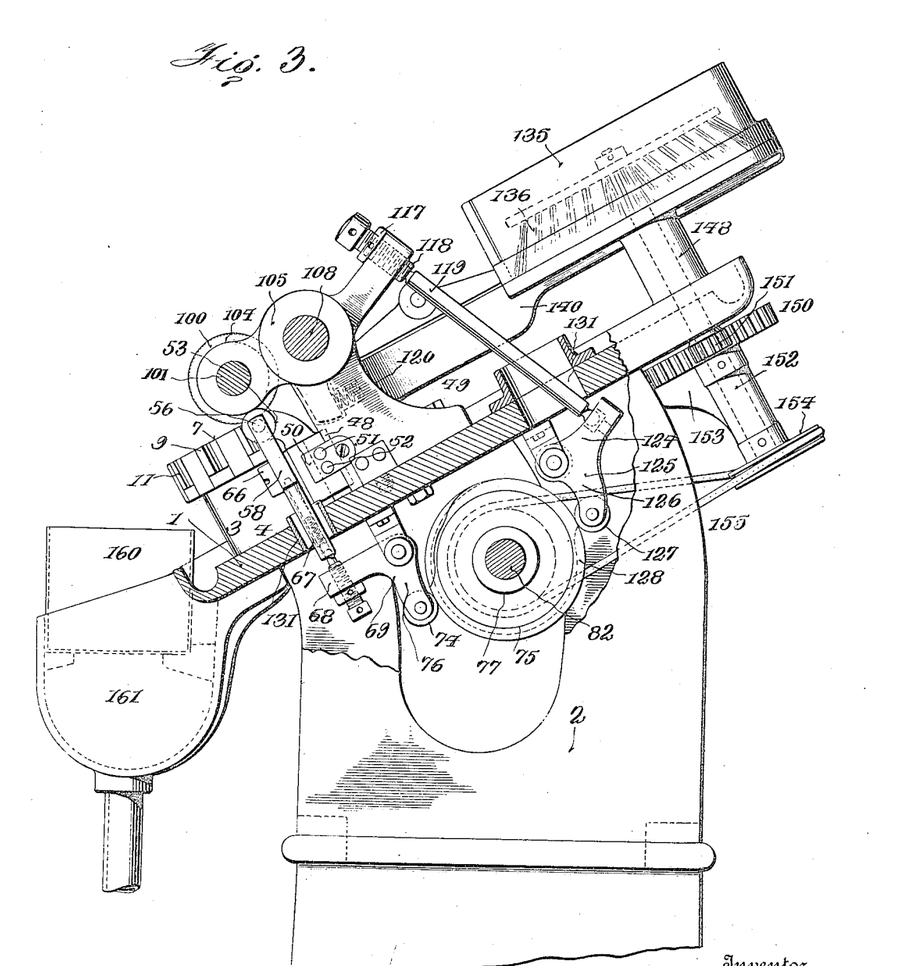
Fig. 3 is a side elevation partly in section, showing one of the slotting saws in operative position.
Figure 3A:
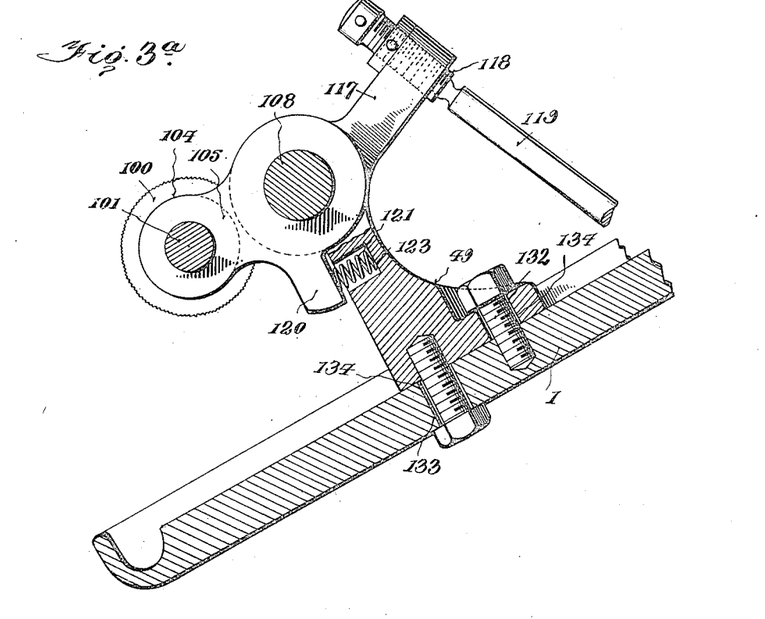
Figure 3B:
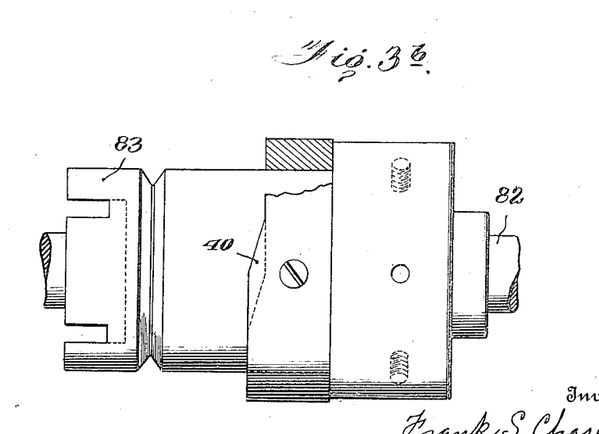

The stud shaft 108 is held in the adjustable bearing blocks 49, hereinbefore referred to, by means of the set screws 115. Pivoted between the ears 46 of the adjustable bearing block 49 is the saw frame 105. The saw frame is best shown in Fig. 3, and consists of a rearwardly projecting arm 117, adapted to receive a screw-threaded pin 118, in the lower end of which latter is mounted the round head of the rod connection 119, to be described presently.

The saw frame is also provided with a downwardly projecting lug 120, which engages a spring 121, held in the recess 123 of the adjustable bearing block 49. The purpose of this is to immediately lift the saw out of the screw blanks that have been slotted, when the slot is finished. This is done by means of the rod connection 119, the lower end of which is seated within the extension 124 of the lever or bell crank 125, see Fig. 3.

This bell crank lever 125 is pivoted in suitable ears of a bracket secured to the under side of the bed plate, and carries between ears on its other arm extension 126, a roller 127 adapted to operate upon the cam 128, see Figs. 3, 7, 8 and 9.

As shown in Fig. 8, the roller is operating in the depression 129, and by reason of the spring 123 contained in the adjustable bearing block, has caused the saw to lift to a non-slotting position. The moment the roller 127 is caused to ride upon the surface of the cam as at 130, the saw is brought into operative position upon the head of the screw to be slotted. A continued operating of the roller upon the cam surface will allow the saw after the screw has been slotted, to be returned for the next operation.

The saw-slotting cam so called, is similar in construction to the gripping cam 75, so termed as above stated, that is, it is held upon the hub section by screws, in the same manner as hereinbefore described.

By this arrangement of parts, it will be seen that an adjustment of the rod connection 119 by means of the threaded pin or stud 118 will vary the depth of the slot to be cut, depending, of course, upon the size and shape of the head of the screw being slotted.

Openings 131 are provided in the bed plate and oil-projecting boxes are secured about the same, so as to prevent any splashing or dropping of the oil upon the mechanism below.

Referring again to the adjustable bearing block 49, as shown in Fig. 3, it is secured to the bed plate 1 by the screws 132 and 133. the former passing down through the bearing block into the bed plate from the top, and the latter passing up through the bed plate into the bearing block. Lateral slots 134 are provided for both screws, thus permitting the bearing block to be adjusted with relation to the screws to be slotted.

Feeding mechanism.

The feeding mechanism now to be described is in duplicate also, like reference characters being applied to both. It consists of a screw receiving hopper 135, (see Figs. 1, 2, 4 and 5) which hopper may be of any desired construction suitable for the purpose, in which is revolubly mounted a brush 136, adapted to sweep the bottom and sides thereof, and at the same time position the screws that have been simply tossed into the hopper, into a slotted chute 137, formed between two adjusting arms 138 of a bar 139, see Figs. 2 and 5. This bar is slid into the hopper so that it lies flush with the bottom of it, and extends outwardly and downwardly into close proximity to the revolving turret 3. it being held into position by the supporting frame 140 of the hopper casting. This mechanism constitutes the feed chute, from which the screws are discharged into the turret.

At the lower ends of the arm 138 of the bar 139 are positioned lugs 140, the purpose of which is to prevent raising of the arms of the bar from its supporting frame. Immediately above these securing lugs are adjusting screws 142, so positioned as to regulate the width of the screw-receiving slot according to the diameters of the screws being slotted.

A bar 143 is mounted just above this slot, and is adapted to rest upon the heads of the screws as they are feeding down into the turret. This bar prevents any jostling or dislodgment of the screws, and, in consequence, any clogging or other impairing of the machine. This bar 143 is held in place by the headed pin 144, engaging the forked opening 145 in the standard 146 secured to the side of the supporting frame casting, and a nut on the end thereof.

This construction permits of either a rigid or loose action of the bar on the heads of the screws.

The brush 136 within the hopper is adapted to sweep the same, and is mounted on the ends of a shaft 148 that passes up through the hopper standard support, see Fig. 3. To the lower end of the shaft 148 is secured a gear 150. Meshing with this gear 150 is a pinion 151, keyed to the upper end of a shaft 152, which is journaled in the bracket.

On the opposite end of this shaft 152 is a grooved pulley 154, around which passes a belt 155, from the grooved hub section 77 on the main shaft, hereinbefore referred to. By this mechanism, the brushes are afforded a slow movement within the hopper, sufficient, however, to properly position the screws that are to feed through the chute into the turrets.

Secured to the front of the bed plate is a standard 158, from which project fingers 159, that engage the screw after it has been slotted, and eject the same into a suitable receptacle 160, held with the drip pan 161 at the front of the machine.

Figure 2:
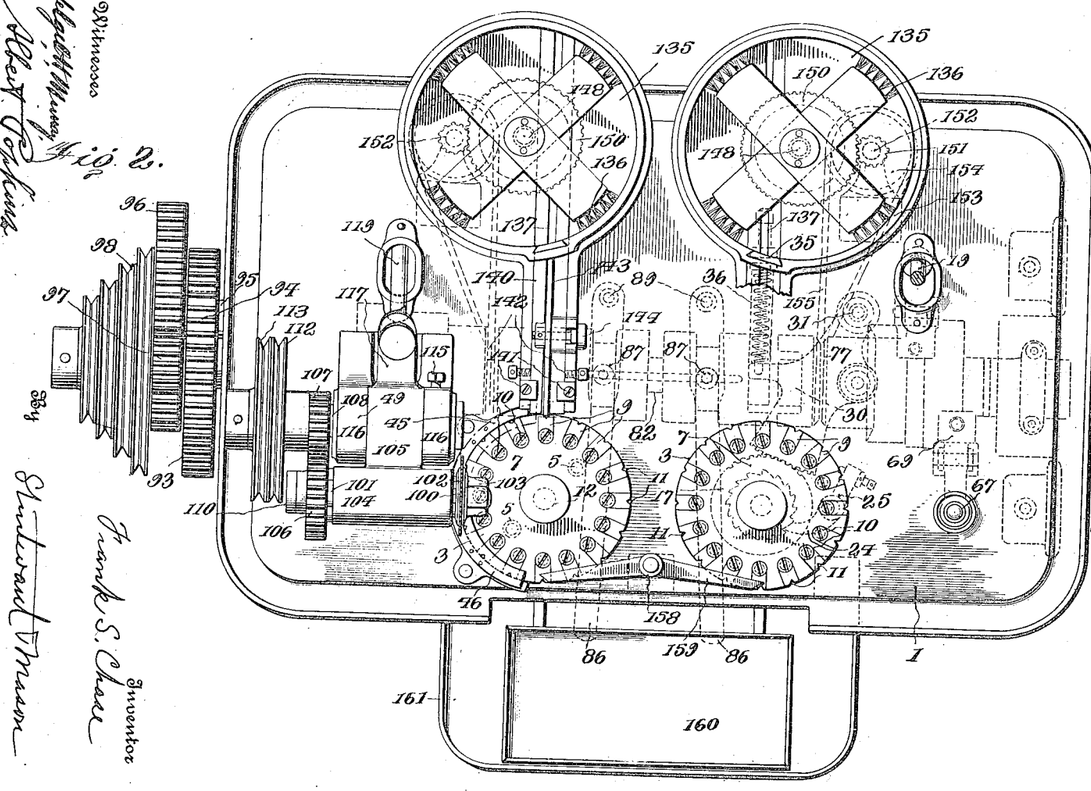
Fig. 2 is a plan view of the same, showing one of the slotting mechanisms removed, and the operating parts in dotted lines beneath the bed plate.

The hub section 77 hereinbefore referred to, is loosely mounted upon the main shaft 82, and carries at its inner end one half of a clutch mechanism 83. Keyed to the main drive shaft is the mating half of this clutch section with which the other half is adapted to mesh. This half 84 is provided with an annular groove, in which works a roller 87, as shown in Figs. 6 and 2, in dotted lines. The roller 87 is carried by the hand lever, which is pivoted beneath the bed plate at 89, and extends forwardly within easy reach of the operator. By this construction, it will be obvious that one or both of the twin slotters may be operated.

With the several mechanisms described, the operation of the twin slotting machine is as follows:

Primarily the screws are tossed into the hoppers, promiscuously, and allowed to adjust themselves by means of the rotating brushes, until they assume a vertical position in the feed chutes, as shown in Fig. 4, from whence they are successively seated within their respective chuck pockets in the revolving turrets. In this position they are transmitted one quarter of a turn to a point where the gripping rod or plunger, by reason of its co-acting parts, as hereinbefore described, firmly holds the screws in place. Simultaneously the slotting saws and their co-acting parts, as above stated, are forced into engagement with the head of the screws that are being firmly held, and are allowed to gradually cut a slot therein the desired depth. Upon the completion of the slotting, the screws are again transmitted another quarter turn, and are then ejected into a common receptacle.

As hereinbefore stated, my improved machine may be readily disconnected from operation by the clutch members, which are independent of one another, and I do not wish to be understood as limiting myself to a twin action entirely.

From the foregoing, it will be seen that an efficient, durable and economical machine of the twin slotter type is provided, in which screw blanks of different sizes are readily slotted at a very high rate of speed.

Having thus described my invention, what I claim as new and desire to secure by Letters Patent, is:—

1. In an organized multiple machine for slotting screws, a plurality of adjacent oppositely rotating turrets provided with chucks for holding screws to be slotted, a plurality of slotting saws, and gripping devices for the screws, a driving shaft for operating said mechanism, and operative connections between the driving shaft and the plurality of mechanisms, whereby the latter may be operated in unison or independently.

2. A twin screw-slotting multiple machine comprising two adjacent oppositely rotating heads or turrets, each having a series of pockets or recesses for receiving screws, a gripping mechanism for each turret to clamp and hold the screws in place, pivoted saw frames each carrying a slotting saw, and means operated from the main shaft to operate both sets of mechanisms simultaneously or independently.

3. In combination, the turret having recesses for the blanks and means for imparting to the turret a step-by-step movement, including a pivoted toothed segment with means for oscillating it, a loose disk on the turret shaft, and a ratchet fast thereon, said loose disk having teeth meshing with the toothed segment and carrying a pawl engaging and driving the ratchet, in one movement, and a locking pawl for engaging the ratchet and holding it while the segment and loose disk are returning into normal position to impart motion to the turret, said locking pawl being pivoted to the machine frame and having an extension located in the path of movement of the pivoted segment and engaged and forced into operative locking position by said segment in its operating movement.

4. In combination, the turret having recesses for the blanks and means for imparting to the turret a step-by-step movement including a pivoted toothed segment with means for oscillating it, a loose disk on the turret shaft, and a ratchet fast thereon, said loose disk having teeth meshing with the toothed segment and carrying a pawl engaging and driving the ratchet in one movement, and a locking pawl for engaging the ratchet and holding it while the segment and loose disk are returning to normal position to impart motion to the turret, said locking pawl being pivoted to the machine frame and having an extension provided with an adjustable abutment, and located in the path of movement of the pivoted segment, and engaged and forced into operative position by said segment in its operating movement.

5. In a machine of the character described, the rotating turret and means for imparting step-by-step movement thereto, comprising the pivoted segment carrying a roller engaging an operating cam and having a spring interposed between the segment and the frame to normally hold the roller against the cam face, a locking pawl engaged by the segment in one movement to be driven into locking engagement with the turret to hold the same.

6. In a machine of the character described, the rotating turret and means for imparting step-by-step movement thereto, comprising the pivoted segment carrying a roller engaging an operating cam, and having a spring interposed between the segment and the frame to normally hold the roller against the cam face, a locking pawl engaged by the segment in one movement to be driven into locking engagement with the turret to hold the same, a shaft supporting the turret, a loose disk driven by the segment, and a fast ratchet driven by a pawl connection with the loose disk.

7. In combination with the turret having recesses for holding the blanks, a spring-retracted gripping tool, an adjustable support therefor, and means for operating the gripping tool comprising a pivoted lever engaging said tool, and operatively connected to the driving shaft.

8. In combination with the turret having recesses for holding the blanks, a spring-retracted gripping tool, an adjustable support therefor, and means for operating the gripping tool, comprising a pivoted lever mounted on said support and engaging said tool and operatively connected to the driving shaft.

9. In combination with the turret having recesses for holding the blanks, a gripping tool for holding the blanks in the recesses, and means for operating the same comprising a pivoted lever operatively engaging the tool and also operatively connected to the driving shaft, said connections to the driving shaft including a spring plunger and a bell crank lever, the latter engaging at one end the spring plunger and at the other end engaging a cam on the driving shaft.

10. In the herein described apparatus, a gripping tool and means for operating the same, including pivoted levers with interposed resilient connections.

11. In the herein described apparatus, a gripping tool, a pivoted lever operating the same, a lever for imparting movement to said pivoted lever, and a yielding connection between the two levers.

12. In the herein described apparatus, a gripping tool, a pivoted lever operating the same, a lever for imparting movement to said pivoted lever, a yielding connection between the two levers, and a spring controlling the gripping tool.

13. In the herein described apparatus, a driving shaft, in combination with the turret having recesses for the blanks to be operated upon, a normally retracted gripping tool, an adjustable block carrying a supporting sleeve therefor, a lever pivoted to said adjustable block and adapted to operate the gripping tool in one direction, a spring plunger between the lever, and one end of a bell crank lever, of which the other end is in engagement with the driving shaft.

14. In the herein described apparatus, a driving shaft, a gripping tool and means for operating the same including the spring plunger mechanism including the plunger 71 and pin 72, the outer sleeve 70 with the pin 73 and connections between the upper end of the plunger and the gripping tool and the lower end of the plunger and the driving shaft.

15. In the herein described apparatus, a driving shaft, a gripping tool and means for operating the same including the spring plunger mechanism including the plunger 71 and pin 72, the outer sleeve 70 with the pin 73, and connections between the upper end of the plunger and the gripping tool and the lower end of the plunger and the driving shaft, said connections between the upper end of the plunger and the gripping tool including a pivoted lever with a recess to receive the pin 72, and the connections between the lower end of the plunger and the driving shaft including a bell crank lever with a recess for the pin 73.

16. The reciprocating gripping tool, the pivoted lever 58 bearing at one end thereon, a resilient plunger mechanism bearing on the lever, a lever on which the resilient plunger rests, and means for operating said lever to transmit to the gripping tool the gripping motion without undue shock.

17. In combination with the rotating turret having recesses for the blanks, an adjustable support, a gripping tool mounted thereon, with means for operating it against spring pressure, to grip the blanks in the recesses, a pivoted slotting saw frame, and means for operating the turret, gripping tool and saw frame in proper sequence.

18. In combination with the gripping tool supported on an adjustable block, the pivoted saw frame supported on an adjustable block, on which latter the gripping tool supporting-block is adjustable.

19. In combination with the spring-pressed pivoted saw frame, an adjustable block supporting the same, a spring-pressed gripping tool and a block supporting the same, said block being adjustable on the saw frame block.

In testimony whereof I affix my signature, in presence of two witnesses.

FRANK S. CHASE.

Witnesses:
 FRANK R. WARNER,
 WARNER MAINE.

Copies of this patent may be obtained for five cents each, by addressing the "Commissioner of Patents, Washington, D. C."